(12) United States Patent
Bass et al.

(10) Patent No.: US 7,818,509 B2
(45) Date of Patent: Oct. 19, 2010

(54) COMBINED RESPONSE CANCELLATION FOR LOAD COMMAND

(75) Inventors: Brian Mitchell Bass, Apex, NC (US); Eric Francis Robinson, Raleigh, NC (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/930,393

(22) Filed: Oct. 31, 2007

(65) Prior Publication Data

US 2009/0113138 A1  Apr. 30, 2009

(51) Int. Cl.
*G06F 12/00* (2006.01)
(52) U.S. Cl. .................. 711/141; 711/119; 711/146; 709/213; 709/214; 709/216
(58) Field of Classification Search .................. 709/213, 709/214, 216, 217, 218, 251
See application file for complete search history.

(56) References Cited

U.S. PATENT DOCUMENTS

| 5,014,267 | A * | 5/1991 | Tompkins et al. ............ 370/259 |
| 6,351,791 | B1 * | 2/2002 | Freerksen et al. ............ 711/146 |
| 6,460,135 | B1 * | 10/2002 | Suganuma .................. 712/221 |
| 2003/0131202 | A1 * | 7/2003 | Khare et al. ................. 711/146 |
| 2005/0240735 | A1 * | 10/2005 | Shen et al. .................. 711/144 |
| 2006/0184750 | A1 * | 8/2006 | Blake et al. ................. 711/147 |
| 2006/0253662 | A1 * | 11/2006 | Bass et al. .................. 711/154 |
| 2008/0109609 | A1 * | 5/2008 | Shen et al. .................. 711/146 |
| 2008/0181161 | A1 * | 7/2008 | Gi Kim et al. .............. 370/312 |

* cited by examiner

*Primary Examiner*—Jack A Lane
(74) *Attorney, Agent, or Firm*—Yee & Associates, P.C.; Matthew B. Talpis

(57) ABSTRACT

A cache coherency technique used in a multi-node symmetric multi-processor system that reduces the number of message phases of a read request from 5 to 4, canceling the combined response phase for read requests in most cases, thereby improving system performance and reducing the overall system power consumption.

11 Claims, 3 Drawing Sheets

COMBINED RESPONSE CANCELLATION FOR LOAD COMMAND

BACKGROUND OF THE INVENTION

1. Field of the Invention

The present invention relates generally to a large multi-processor system. Specifically, exemplary embodiments provide a computer implemented method, apparatus, and computer-usable program code for responding to a load instruction that missed in its local caches in a multi-processor network.

2. Description of the Related Art

Increasingly large symmetric multi-processor data processing systems are being built on multiple chips, which communicate with each other through a ring, where a request, known as a command, or data can be moved from one chip to another chip in the system. A chip is composed of one or more processors, a cache, a system memory, and input-output units.

As the system configuration grows, more chips are needed, the ring becomes longer, and more traffic is needed to ensure the correctness of system functions and data consistency. As communication on the ring in a large system increases, there is more power consumption and ring bandwidth is reduced, thereby degrading system performance.

The current art requires 5 phases to satisfy a read request, as follows:

1) Request phase: A read request is placed on the ring.

2) Reflected request phase: The arbiter reflects the request on the ring, called the "reflected read request," for all snoopers. That is, the arbiter broadcasts the selected request to all snoopers on the bus.

3) Snoop phase: All snoopers in the system place their snoop reply information on the ring, which is forwarded to the arbiter that broadcast the request.

4) Combined Response phase: The arbiter combines the snoop reply information from all of the snoopers into a single response, called a "combined response," and then places this combined response on the ring to be seen by all snoopers.

5) Data transfer phase: Data is transferred to the requester.

In the current art, the arbiter just combines the snoop replies from all the snoopers, and sends the combined response information out on the ring to all the snoopers. The snoopers take appropriate action(s) based on the information contained within the combined response.

Although there is a very large variety of combined response information, depending on the particular implementation, the most important information is typically these three bits: the retry bit, the intervention bit, and the shared bit.

a) If the retry bit is set, all snoopers and the memory controller will stop working on the request and go idle; there will be no data transfer for the current request. The requester must resend its initial read request.

b) If the retry bit is not set, and the intervention bit is set, the memory controller will stop working on the request and go idle. The intervening cache will send the requested data to the requester (phase 5). The requester and the intervener caches update their cache states appropriately depending on the request type and the value of the shared bit in the combined response.

c) If neither the retry nor the intervention bit is set, the memory controller will continue to honor the request and will send the data to the requester (phase 5). The requestor's cache updates its cache state accordingly based on the shared bit value in the combined response. If the shared bit is set, then the requestor's cache changes cache state to shared. If the shared bit is NOT set, then the requestor's cache may choose to accept the line in the exclusive state (depending on implementation). The exclusive state for a cache line means there are no other caches in the system that have a copy of that cache line.

SUMMARY OF THE INVENTION

The exemplary embodiments provide a computer-implemented method and apparatus for responding to a load instruction that missed in its local caches in a multi-processor network. In response to a read request, replies are gathered from nodes in the multi-processor network. The replies are analyzed. Based on the analysis either a combined response or data is sent.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
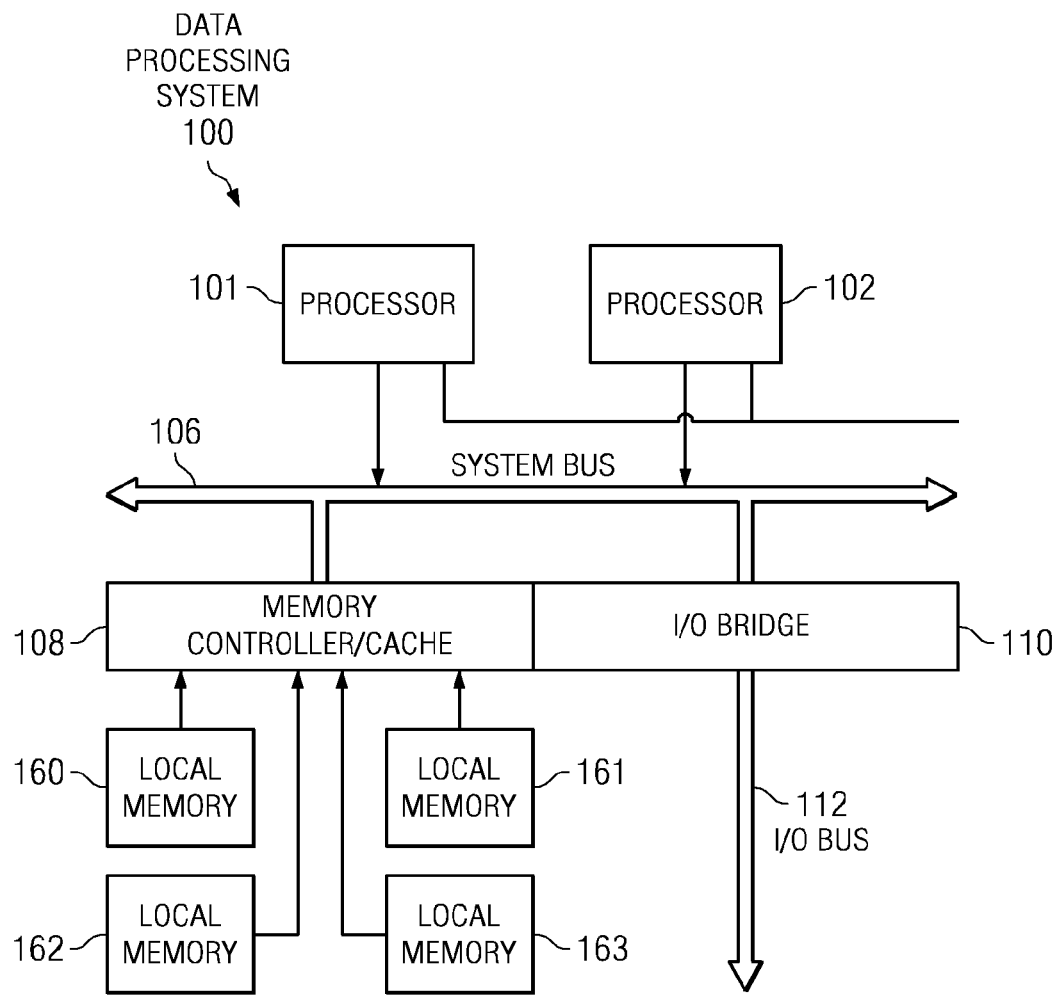
FIG. 1 is a block diagram of a data processing system in which illustrative embodiments may be implemented.

With reference now to the figures, and in particular with reference to FIG. 1, a block diagram of a data processing system in which illustrative embodiments may be implemented is depicted. Data processing system 100 may be a symmetric multiprocessor (SMP) system including processors 101 and 102, which connect to system bus 106. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Those of ordinary skill in the art will appreciate that the hardware depicted in FIG. 1 may vary. The depicted example is not meant to imply architectural limitations with respect to illustrative embodiments.

Figure 2:
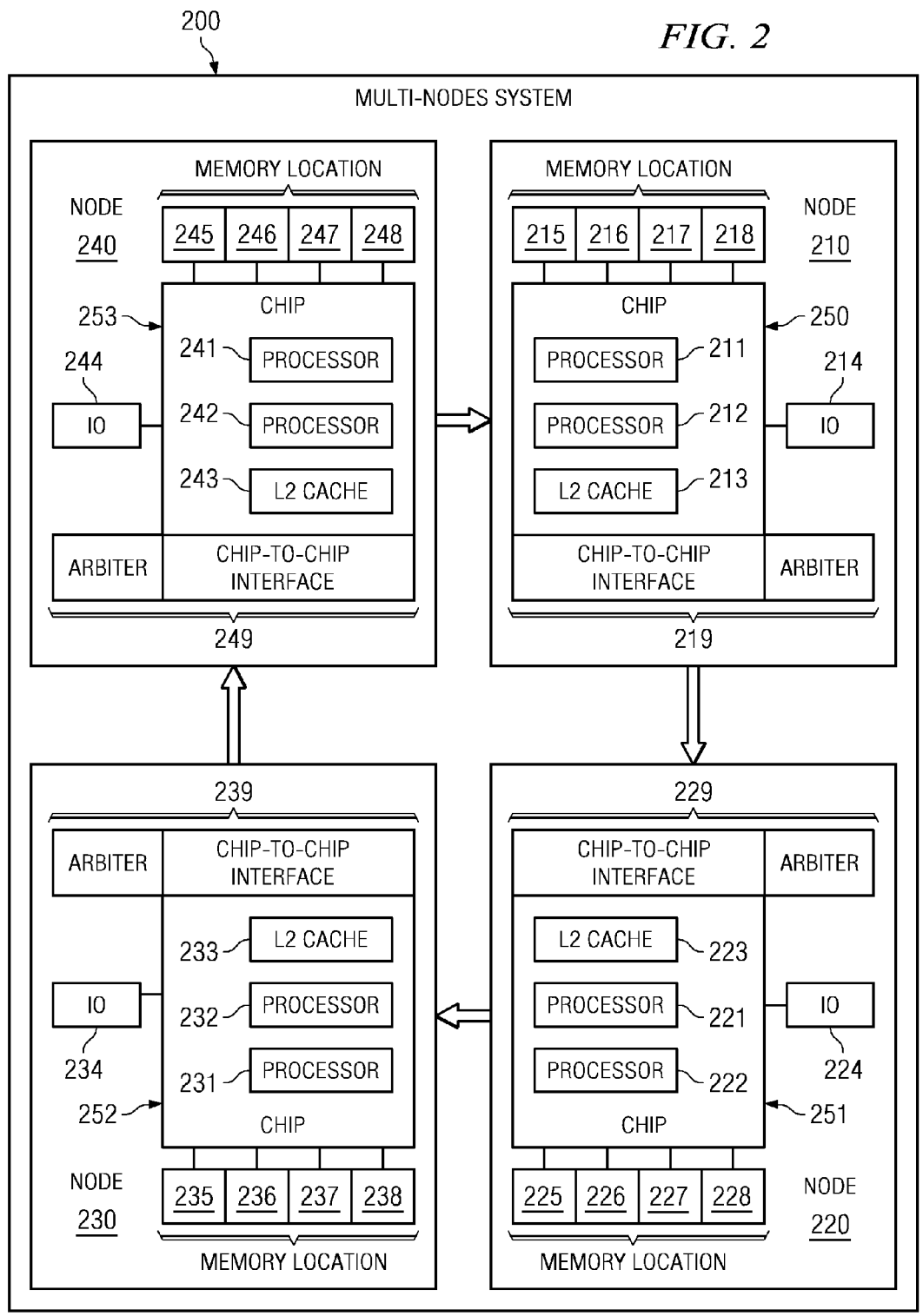
FIG. 2 is a block diagram of a typical 8-way in 4 nodes multi-processor (MP) system in accordance with an exemplary embodiment.

FIG. 2 is a block diagram of a typical 8-way in 4 nodes multi-processor (MP) system in accordance with an exemplary embodiment. FIG. 2 shows 8 processors organized as 4 groups of 2 processors. Multi-node system 200 is a ring network. A ring network is a network topology in the form of a closed loop or circle. Each node in the network is connected to the next, and messages move in one direction around the system. When a message arrives at an individual node, that node examines the information in the message and takes an appropriate action. Multi-node system 200 is depicted as a ring topology, but those of ordinary skill in the art will recognize that the exemplary embodiments may be implemented in a variety of other system configurations such as, for example, but not limited to, a star or bus network.

Multi-node system 200 comprises four (4) nodes, nodes 210, 220, 230, and 240. Each node has one processor chip, chips 250, 251, 252, and 253, respectively, with two (2) processors on each chip, processors 211, 212, 221, 222, 231, 232, 241, 242, respectively. Each node has an L2 cache, L2 caches 213, 223, 233, and 243, respectively, which are shared by the two processors on the node. The I/O sub-system, IOs 214, 224, 234, and 244, respectively, and memory sub-system are distributed among the nodes through a memory-mapping scheme.

Memory locations from 215 to 218 belong to node 210, memory locations 225 to 228 belong to node 220, memory locations 235 to 238 belong to node 230, and memory locations 245 to 248 belong to node 240. Node 210 also comprises a bus arbiter and chip-to-chip communication interface 219. Node 220 also comprises a bus arbiter and chip-to-chip communication interface 229. Node 230 also comprises a bus arbiter and chip-to-chip communication interface 239. Node 240 also comprises a bus arbiter and chip-to-chip communication interface 249.

Consider node 210. When processor 211 executes a load instruction and the information is not found in L2 cache 213, L2 cache 213 sends a read request to bus arbiter and chip-to-chip communication interface 219 to read the data from memory. After winning arbitration, the read request is placed on the ring (phase 1) as a read request message. The read request message is forwarded from node to node until the read request reaches the node, either node 220, 230, 240 or 210, that is dedicated to the memory address range that the read is targeting. This node is referred to as the dedicated node for this read request. Phase 2 begins when the arbiter on the dedicated node reflects the read request to all bus agents in the system, by placing the request on the ring as a reflected command. This prepares the dedicated system memory on the dedicated node to start servicing the read request.

In a snooping system, all caches on the bus monitor, or snoop, the bus requests to determine if they have a copy of the block of data that is requested on the bus and then they provide a snoop reply. Sometimes referred to as a bus-snooping protocol, a snooping protocol is a protocol for maintaining cache coherency in symmetric multiprocessing environments. During phase 2, when the reflected read request is sent around the ring, all of the caches in the system snoop the read request. They then provide a snoop reply (phase 3) back to the bus.

In a single node multiprocessor system, the dedicated node is the same node where the initial request originated. In a multiple node multiprocessor system, the requested data can be either in the cache in the same node or in another node or it could be in the dedicated node's memory.

The dedicated node's arbiter is responsible for gathering the snoop replies from all of the nodes, combining them into a single result, known as a combined response, and then sending out this combined response on the ring. All nodes analyze the combined response to determine their next action.

In current art, there are 5 phases for a read request, which is a request to read data from system memory. Phases 1 through 5 for this read request travel through the ring network in the multi-node system 200 and a phase cannot start until the previous phase has completed. The five phases are: (1) request phase, (2) reflected request phase, (3) snoop phase, (4) combined response phase, and (5) data transfer phase.

In some system implementations, the data transfer could happen before the combined response through an "early data intervention" process if certain cache conditions are met. However, all 5 phases are still needed to complete a read request.

Exemplary embodiments provide for a response to a read request that comprises only four (4) phases, as opposed to the five (5) phases documented in the current art. The requester of a read request will see either the requested data or a retry combined response returned, but not both. Exemplary embodiments provide a substantial system performance improvement on multiple fronts: (1) the data is available early to the requesting processor; (2) message traffic on the ring (or rings if there are multiple bus coherency rings in the system) is reduced which results in higher bus bandwidth for servicing other requests because there are only 4 phases and not five; (3) less message traffic results in a power saving for the system.

Exemplary embodiments provide for the following four (4) phased response to a read request. Phase 1 is the request phase. In phase 1, a cache sends a read request. Phase 2 is the reflected request phase. Phase 2 is initiated by the dedicated node, which is determined by comparing the read request's address to each node's memory range address as the read request traverses the ring during phase 1. In phase 2, the snoopers check their caches for a copy of the requested data and system memory also starts retrieving the requested data. During phase 3, the snoop phase, all snoopers provide their snoop reply; they report their cache state and/or ability to intervene the data for the snooped request, or they report, "retry". Snoopers retry the read request when they are not able to honor the read request at the current time for reasons such as: (1) they are not able to perform the directory lookup because they are busy doing something else; (2) they performed the lookup and had a hit, but the necessary resources to perform an intervention are not available; (3) they have not yet completed a prior request for the same address.

The last phase, phase 4, is the retry combined response or data transfer phase. In phase 4, the dedicated node gathers all of the replies from the snoopers and analyzes the information in the replies to match a triplet of bits to a pre-determined pattern. There are several possible cases that can result:

Case A: No retry bits are set, and an intervention bit is set. The shared bit can either be set or unset. The dedicated node arbiter signals to its node's memory controller to stop working on the pending read request because a cache on the intervening node will source the requested data and provide the cache state change information to the requesting node. The requesting node and the intervening node update their cache states accordingly.

Case B: One or more retry bits are set, and an intervention bit is set. The shared bit can either be set or unset. The arbiter ignores the retry bit because a cache somewhere indicated that it was going to intervene the data. The dedicated node's arbiter signals to its node's memory controller to stop working on the pending read request because a cache of the intervening node will source the requested data and provide the cache state change information to the requesting node. The requesting node and the intervening node update their cache states accordingly.

Case C: A retry bit is set and no intervention bits are set. The shared bit can either be set or unset. In this case, the dedicated node sends out to the ring a combined response of "retry." No data is transferred, and the requesting node will restart the initial request sequence.

Case D: No retry, intervention, or shared bits are set. The memory controller of the dedicated node sources the requested data and signals the requesting node's cache that it may change its cache state to exclusive (or to shared if so desired).

Case E: No retry or intervention bits are set, but the shared bit is set. The memory controller of the dedicated node sources the requested data and signals the requesting node's cache to set its cache state to shared.

Multiple caches in a system may have a copy of the data in a shared state, but only one cache in a system may have that data in the exclusive state.

By modifying phase 4 as described above, the exemplary embodiment has been able to accomplish the read request in 4 phases instead of 5 and reduce system resources, power, bandwidth, and latency.

Figure 3:
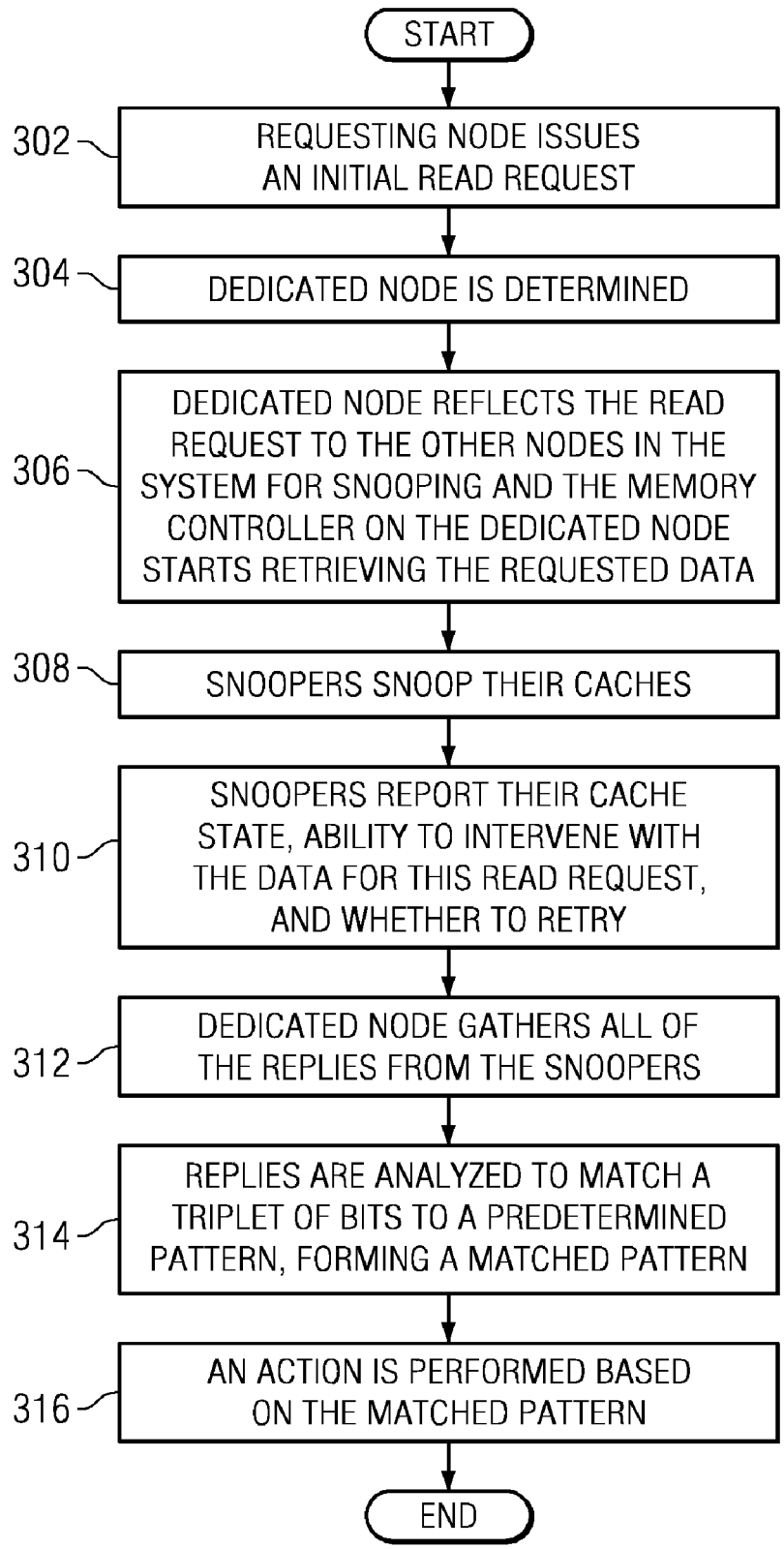
FIG. 3 is flowchart illustrating the operation of responding to a load request in accordance with an exemplary embodiment.

FIG. 3 is flowchart illustrating the operation of responding to a load instruction that missed in its local caches in a multi-processor network in accordance with an exemplary embodiment. The operation of FIG. 3 may be implemented in a multi-node system, such as multi-node system 200 in FIG. 2. The operation begins when a requesting node issues an initial read request (step 302). A dedicated node is determined (step 304). In order to determine the dedicated node, each node compares the node's memory range address to the address in the read request. The node whose memory range addresses include the address in the request is determined to be the dedicated node. At this point, the read request is no longer transmitted around the network. Instead, the dedicated node reflects the read request to the other nodes in the system for snooping and the memory controller on the dedicated node starts retrieving the requested data (step 306). Specifically, the arbiter on the dedicated node reflects the read request to all nodes for snooping. The snoopers snoop their caches (step 308). The snoopers report their cache state, ability to intervene with the data or retry for this read request (step 310). The dedicated node gathers all of the replies from the snoopers (step 312). The replies are analyzed to match a triplet of bits to a pre-determined pattern, forming a matched pattern (step 314). An action is performed based on the matched pattern (step 316) and the operation ends.

The triplet of bits is the intervention bit, the retry bit and the shared bit. The pre-determined patterns and the actions to be performed based on the pre-determined pattern are as follows. In an alternate exemplary embodiment, the intervention, retry, and shared bits are analyzed according to a logical progression and an action is performed based on the outcome of this analysis.

Pre-determined patterns 1 and 2: No retry bits are set, an intervention bit is set, and the shared bit is either set or not set. The dedicated node arbiter signals to its node's memory controller to stop working on the pending read request because a cache on the intervening node will source the requested data and provide the cache state change information to the requesting node. The requesting node and the intervening node update their cache states accordingly.

Pre-determined patterns 3 and 4: One or more retry bits are set, an intervention bit is set, and the shared bit is either set or not set. The dedicated node's arbiter signals to its node's memory controller to stop working on the pending read request because a cache of the intervening node will source the requested data and provide the cache state change information to the requesting node. The requesting node and the intervening node update their cache states accordingly.

Pre-determined patterns 5 and 6: A retry bit is set, no intervention bits are set, and the shared bit is either set or not set. In this case, the dedicated node sends out to the ring a combined response of "retry." No data is transferred, and the requesting node will restart the initial request sequence.

Pre-determined pattern 7: No retry, intervention, or shared bits are set. The memory controller of the dedicated node sources the requested data and signals the requesting node's cache that the requesting node may change the requesting node's cache state to exclusive or to shared, as desired by the requesting node.

Pre-determined pattern 8: No retry or intervention bits are set, but the shared bit is set. The memory controller of the dedicated node sources the requested data and signals the requesting node's cache to set its cache state to shared.

An example of the operation of one embodiment of the disclosure: Node 210 issues an initial read request, step 302, which is phase 1. This request is sent to node 220, which is the next node sequentially, in multi-node system 200. In this example, node 220 happens to be the dedicated node for the initial request, based on the requesting memory range address. Phase 2 begins when dedicated node 220 reflects the read request, step 306, to its own caches and memory controller and to the other nodes 230, 240 and 210, in sequence, which is also part of phase 2.

The memory controller on dedicated node 220 starts retrieving the requested data. During phase 3, cache 223 provides a snoop reply, step 310, of NULL because cache 223 does not have the data in this example. Similarly, node 230 provides a snoop reply, step 310, of NULL because cache 233 does not have the data. In addition, node 240 snoops the cache of node 240, cache 243, and provides a snoop reply, step 310, indicating that node 240 does have a copy of the requested data and is able to intervene the data to the requester. Therefore, node 240 asserts the intervention bit. In addition, still in phase 3, node 210 snoops the cache of node 210, cache 213, and replies, step 310, NULL because node 210 is the requesting node; if node 210 had the data, then node 210 would not have made the bus read request in the first place.

Node 220 receives the snoop replies, step 312, from nodes 230, 240, and 210, analyzes the replies to determine a match for the triplet of bits to a pre-determined pattern, step 314, and sees that an intervention bit is set, no retry bits are set. Node 220 signals to its memory controller to stop processing the read command and to go idle step 316, which is part of phase 4. Node 240 sources the requested data and cache state information to node 210, step 316, which is still a part of phase 4. Finally, node 210 updates its cache to an appropriate state accordingly step 316. No combined response is sent around the ring. The cache state information is transferred along with the requested data.

Thus, exemplary embodiments provide for a response to a read request that comprises only four (4) phases, as opposed to the five (5) phases documented in the current art. The requester of a read request will see either the requested data or a retry combined response returned, but not both. Exemplary embodiments provide a substantial system performance improvement on multiple fronts: (1) the data is available early to the requesting processor; (2) message traffic on the ring (or rings if there are multiple bus coherency rings in the system) is reduced which results in higher bus bandwidth for servicing other requests because there are only four phases and not five; (3) less message traffic results in a power saving for the system.

The invention can take the form of an entirely hardware embodiment, an entirely software embodiment or an embodiment containing both hardware and software elements. In the preferred embodiment, the invention is implemented in hardware.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, record, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. For example, the embodiment describes a ring topology, but other system configurations such as a star or bus network could also be used effectively with the present invention. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for responding to a load instruction that missed in its local caches in a multi-processor network, the computer implemented method comprising:
    responsive to a read request, gathering replies from nodes in the multi-processor network;
    analyzing the replies;
    based on the analysis, sending one of either a combined response or data; and
    wherein when analyzing the replies comprises determining that a retry bit is not set and an intervention bit is set:
        signaling a memory controller of a dedicated node to cancel the read request and go idle;
        sourcing data for the read request and cache state change information from an intervening node; and
        updating cache state by the intervening node and a requesting node.

2. The computer implemented method of claim 1, wherein when analyzing the replies comprises determining that a retry bit is set and an intervention bit is set:
    signaling a memory controller of a dedicated node to cancel the read request and go idle;
    sourcing data for the read request and cache state change information from an intervening node; and
    updating cache state by the intervening node and a requesting node.

3. The computer implemented method of claim 1, wherein when analyzing the replies comprises determining that a retry bit is set and an intervention bit is not set:
    wherein the combined response indicates to retry the read request; and
    re-issuing the read request by a requesting node.

4. The computer implemented method of claim 1, wherein when analyzing the replies comprises determining that a retry bit is not set, an intervention bit is not set, and a shared bit is not set:
    sourcing data for the read request by a dedicated node; and
    signaling a requesting node that the requesting node may change a cache state of the requesting node to either shared or exclusive, as determined by the requesting node.

5. The computer implemented method of claim 1, wherein when analyzing the replies comprises determining that a retry bit is not set, an intervention bit is not set, and a shared bit is set:
    sourcing data for the read request by a dedicated node; and
    signaling a requesting node to set a cache state of the requesting node to shared.

6. A data processing system for responding to a load instruction that missed in its local caches in a multi-processor network, the data processing system comprising:
    a plurality of nodes, wherein the plurality of nodes are configured to, responsive to a read request, gathering replies from nodes in the multi-processor network; analyze the replies;
    based on the analysis, send one of either a combined response or data; and
    wherein when configuring the plurality of nodes to analyze the replies comprises configuring the plurality of nodes to determine that a retry bit is not set and an intervention bit is set:
        configuring the plurality of nodes to signal a memory controller of a dedicated node to cancel the read request and go idle, source data for the read request and cache state change information from an intervening node, and update a cache state by the intervening node and a requesting node.

7. The data processing system of claim 6, wherein when configuring the plurality of nodes to analyze the replies comprises configuring the plurality of nodes to determine that a retry bit is set and an intervention bit is set:
    configuring the plurality of nodes to signal a memory controller of a dedicated node to cancel the read request and go idle; source data for the read request and cache state change information from an intervening node; and update a cache state by the intervening node and a requesting node.

8. The data processing system of claim 6, wherein when configuring the plurality of nodes to analyze the replies comprises configuring the plurality of nodes to determine that a retry bit is set and an intervention bit is not set:
configuring the plurality of nodes to re-issue the read request by a requesting node, wherein the combined response indicates to retry the read request.

9. The data processing system of claim 6, wherein when configuring the plurality of nodes to analyze the replies comprises configuring the plurality of nodes to determine that a retry bit is not set, an intervention bit is not set, and a shared bit is not set:
configuring the plurality of nodes to source data for the read request by a dedicated node; and signal a requesting node that the requesting node may change a cache state of the requesting node to either shared or exclusive, as determined by the requesting node.

10. A computer program product comprising:
a computer recordable medium having computer usable program code for responding to a load instruction that missed in its local caches in a multi-processor network, the computer program product comprising:
computer usable program code, responsive to a read request, for gathering replies from nodes in the multi-processor network;
computer usable program code for analyzing the replies;
computer usable program code for based on the analysis, sending one of either a combined response or data:
wherein when the computer usable program code for analyzing the replies further comprises computer usable program code for determining that a retry bit is not set and an intervention bit is set:
computer usable program code for signaling a memory controller of a dedicated node to cancel the read request and go idle;
computer usable program code for sourcing data for the read request and cache state change information from an intervening node; and
computer usable program code for updating cache state by the intervening node and a requesting node.

11. The computer program product of claim 10, wherein when the computer usable program code for analyzing the replies further comprises computer usable program code for determining that a retry bit is not set, an intervention bit is not set, and a shared bit is not set:
computer usable program code for sourcing data for the read request by a dedicated node; and
computer usable program code for signaling a requesting node that the requesting node may change a cache state of the requesting node to either shared or exclusive, as determined by the requesting node.

* * * * *